May 3, 1966  R. E. CLICKNER, JR  3,249,012
UMBILICAL DISCONNECT

Filed April 3, 1964  2 Sheets-Sheet 1

INVENTOR
RUSSELL E. CLICKNER, JR.

BY
ATTORNEYS

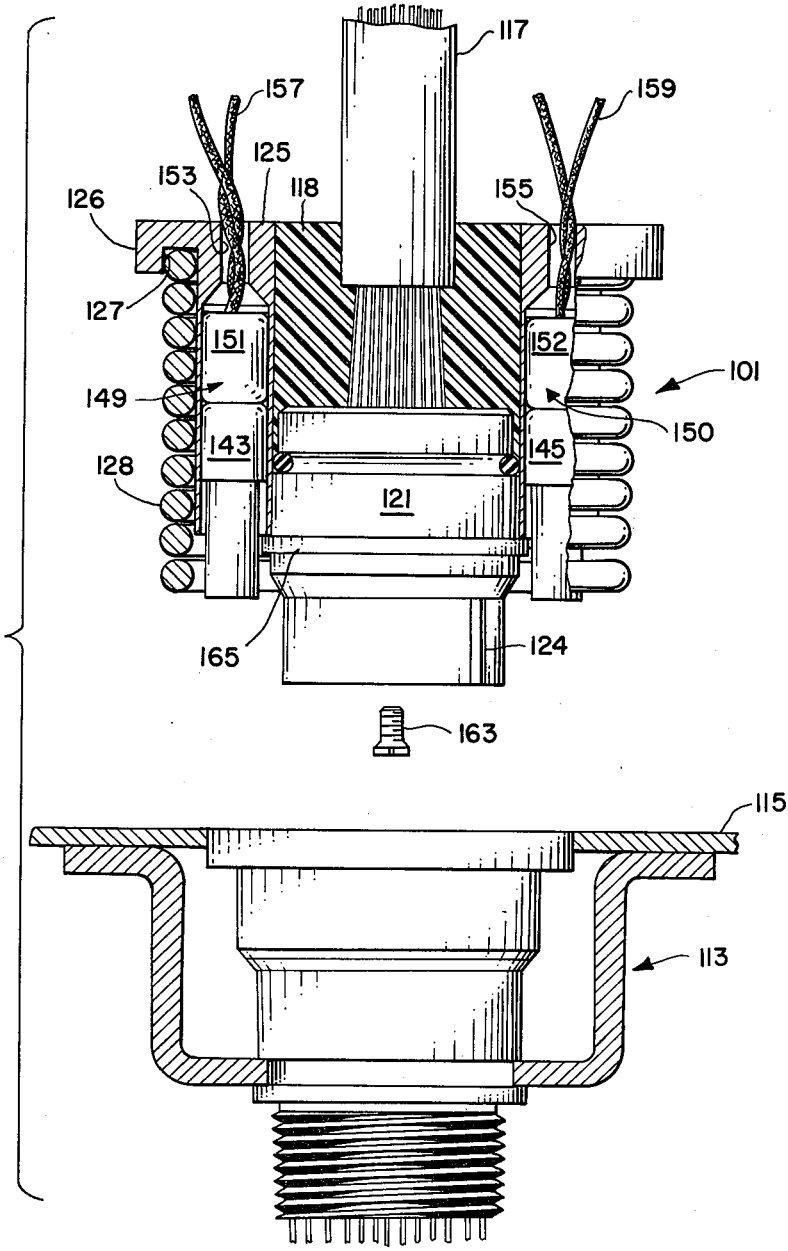

United States Patent Office 3,249,012
Patented May 3, 1966

3,249,012
UMBILICAL DISCONNECT
Russell E. Clickner, Jr., Pasadena, Tex., assignor to the United States of America as represented by the Administrator of the National Aeronautics and Space Administration
Filed Apr. 3, 1964, Ser. No. 357,334
4 Claims. (Cl. 89—1.7)

The invention described herein may be manufactured and used by or for the Government of the United States of America for governmental purposes without the payment of any royalties thereon or therefor.

This invention relates to a connect and quick disconnect mechanism and relates with particularity to a remotely actuated quick disconnect for umbilical cables employed to transfer energy from a ground source to a rocket propelled vehicle which is loaded and ready for launching.

One example of a presently known remote control umbilical disconnect employs a hydraulic operated cable with a pulley and counterweight disconnect system. This known device is quite bulky ad occasionally unreliable due to the complexity of the hydraulic system and the pulley and weight assembly employed therein. Another known remotely actuated disconnect device employs an explosive charge for shearing sections of the connecting mechanism to effect release of the umbilical cable. This explosive system has the inherent disadvantage of not being reusable in case of a flight abort, or a hold order occurring after umbilical disconnect, since on-site replacement of the sheared elements is too hazardous.

An additional known remotely controlled disconnect employs the use of shear pins connecting the umbilical cable and the rocket powered vehicle, with the pins being sheared upon movement of the vehicle from the launch pad. This system has the disadvantage of not propelling the umbilical cable away from the vehicle and could tend to cause the cable to become entangled with fins or other aft portions of the vehicle with disasterous results. In addition to these presently known remotely actuated disconnects, the disconnection of umbilical cables has been performed manually. However, due to obvious safety reasons, the size of rocket motors currently used and proposed for use in the future, coupled also with the necessary complexity of the energy transfer means employed in umbilical cables, any contemplated manual disconnect procedure is impractical. Accordingly, the need for a safe and reliable remote control umbilical disconnect is urgent.

It is therefore an object of the present invention to provide a new and novel remote controlled umbilical disconnect assembly.

Another object of the present invention is the provision of a remotely actuated explosive disconnect to propel an umbilical cable away from a rocket propelled vehicle prior to launch thereof.

An additional object of this invention is the provision of a simple, lightweight, reliable, explosively actuated umbilical disconnect.

A further object of the present invention is a rugged and novel reusable umbilical disconnect assembly for use with moving vehicles.

Yet another object of the present invention is a safe, on-site reloadable disconnect assembly.

According to this invention, the foregoing and other objects are obtained by providing a remotely actuated explosive disconnect assembly for an umbilical cable that is employed to transfer energy from a remote ground station or energy source to a movable vehicle, such as for example, a rocket propelled experimental space probe being readied for launch at the launch site.

The disconnect assembly is attached to the terminal end of the umbilical cable and includes a male electrical connective plug having a plurality of prongs thereon in electrical connection with individual wires of the cable and adapted to slidably engage a plurality of sockets in a female electrical receptacle. The female receptacle is secured interiorly of, and adjacent a port in, the vehicle casing with individual sockets therein being in electrical connection with the vehicle components to receive the energy transferred thereto by the umbilical cable. A circumferential sleeve is secured about the male plug adjacent the pronged section thereof. A pair of diametrically opposed explosively driven pistons are provided in this sleeve and are adapted to push against the vehicle body upon actuation of an explosive charge to remove the male plug from its frictional engagement with the female receptacle and propel the umbilical cable outwardly from the vehicle. The piston members may either be propelled by gaseous forces generated by gas producing explosive charges employed within the male plug element, or may be directly propelled by the explosive force.

In a modified embodiment of the present invention a coil spring is also positioned around the sleeve member and adapted to be under compression when the male plug is inserted through the vehicle port and frictionally attached to the female receptacle. During removal of the frictional engagement forces in this embodiment, the uncoiling of the compressed spring uniformly distributes the piston forces and assists in propelling the umbilical cable away from the rocket vehicle.

A more complete appreciation of the invention and many of the attendant advantages thereof will be more readily apparent as the same becomes better understood by reference to the following detailed description when considered in connection with the accompanying drawings, wherein.

Figure 1:
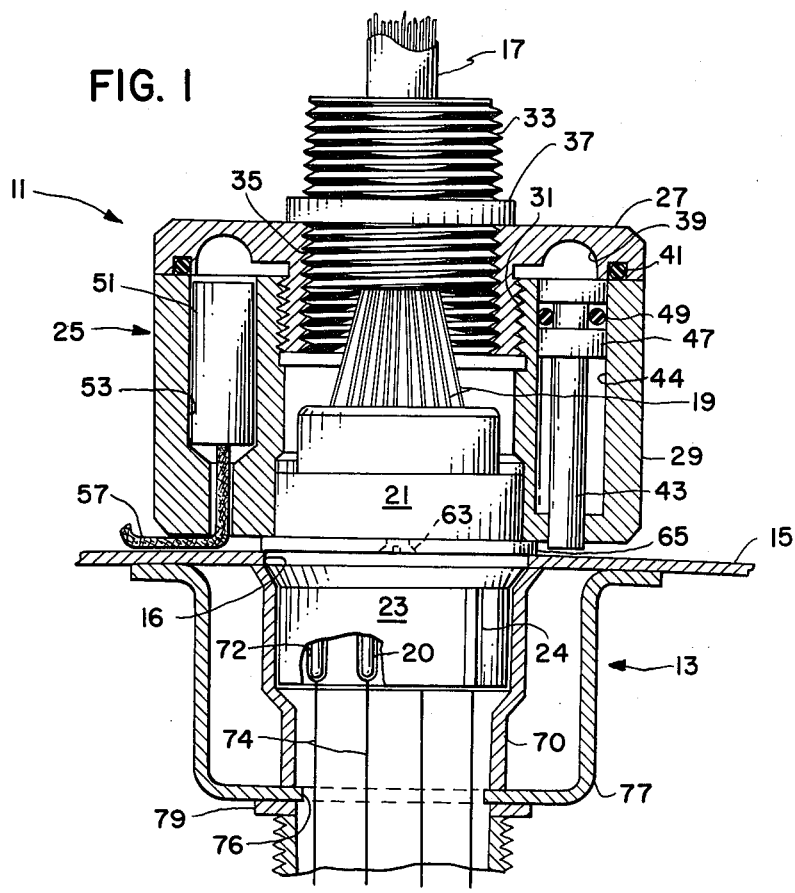
FIG. 1 is a view of the assembled umbilical connect and disconnect assembly of the present invention as attached to a rocket vehicle, with parts broken away.
Figure 2:
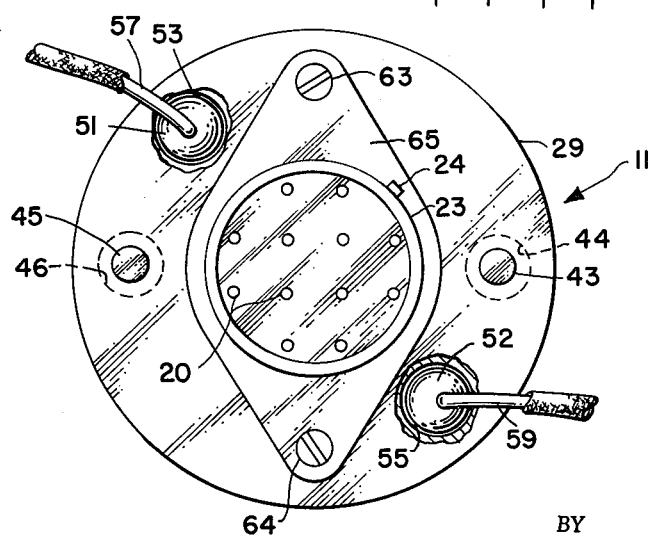
FIG. 2 is a bottom plan view of the disconnect assembly with parts broken away and, FIG. 3 is an exploded view of the main parts of a modified umbilical disconnect assembly according to the present invention, with parts thereof shown in section.

Referring now to the drawing and more particularly to FIG. 1 and FIG. 2, there is shown an umbilical connect and disconnect assembly generally designated by reference numeral 11. One end of assembly 11 is received through a port 16 in the sidewall of vehicle 15 for connection with a female electrical receptacle 13. Receptacle 13 is interiorly secured within vehicle 15, as will be further explained hereinafter. The other end of assembly 11 is secured to the terminal end of an umbilical cable 17 which leads to a remotely positioned energy source, not shown. A plurality of electrical wires 19 pass through the interior of cable 17 into disconnect assembly 11 and are secured in a conventional manner to a plurality of prongs 20 forming part of male plug 21. A protective ring 23 is attached to male plug 21 and protectively surrounds prongs 20. Ring 23 is provided with a key 24 which is adapted to frictionally engage a mating keyway in female receptacle 13.

A two-part circumferential sleeve 25 is positioned around male plug 21 and consists of a centrally tapped cover or manifold 27 and a tubular base or action section 29. Base 29 and manifold 27 are threadedly connected at 31 and manifold 27 is threadedly connected at the tapped opening 35 thereof to a cable fitting 33. Cable fitting 33 is exteriorly threaded and positioned about the terminal end of umbilical cable 17 for retaining the connect and disconnect assembly thereto. A retainer nut 37 is threaded onto fitting 33 and bears against manifold 27 to prevent slippage of disconnect assembly 11 with respect to umbilical cable 17.

Manifold 27 is provided with a substantially hemispherical shaped annular gaseous passageway 39 facing base 29. A conventional O-ring seal 41 is disposed within an annular cavity adjacent passageway 39 so as to abut base 29 when the two members are attached and to provide a gaseous seal between these members. Base 29 is provided with a pair of diametrically opposed identical pistons 43 and 45 (FIG. 2) disposed, respectively, in cylinders 44 and 46. Cylinders 44 and 46 are in communication with gas passageway 39 (FIG. 1).

As shown more distinctly in FIG. 1, piston 43 includes an enlarged head portion 47 having a circumferential reduced intermediate area thereon in which is disposed a sealing O-ring 49. Piston 45 is of identical construction and the details of which are not shown in the drawing, in the interest of brevity. Also disposed in base or action member 29 is a pair of conventional diametrically opposed gas generating squibs, designated by reference numerals 51 and 52. Squibs 51 and 52 are positioned within a pair of oppositely disposed identical bores 53 and 55 (FIG. 2) which are also in communication with gaseous passageway 39. Electrical lead wires 57 and 59 extend, respectively, through bores 53 and 55 to connect, respectively, with squibs 51 and 52. The other end of lead wires 57 and 59 are connected to a conventional electrical circuit positioned at a remote location, and not shown in the interest of clarity. A conventional potting compound, not illustrated, may be placed in bores 53 and 55 to seal sleeve 29 from outside moisture and other contaminants, in a conventional manner.

Referring now more specifically to FIG. 2, male plug 21 is attached to base 29 by a pair of screws 63 and 64 extending through flange 65 into the base or action member 29. Flange 65 is disposed about male plug 21 at the base of tubular ring 23 and attached thereto by welding, or other conventional attachment means. Thus, through the use of retainer nut 37 bearing against one face of sleeve 25, and flange 65 bearing against the other end thereof, disconnect assembly 11 is maintained securely attached to the terminal end of umbilical cable 17 at all times.

Referring once again to FIG. 1, when assembly 11 is to be connected to vehicle 15, key 24 on tubular ring 23 is slidably received by a mating keyway, not shown, in coupling 70 of female receptacle 13. In this position prongs 20 are in frictional engagement with a plurality of individual conductive female sockets. 72. Each individual socket 72 is in electrical connection with individual wires 74 leading to various vehicle instrument components such for example storage batteries, not shown, disposed within vehicle 15 for receiving the electrical energy through the umbilical cable 17. Female receptacle 13 is maintained in fixed position within vehicle 15 by conventional means, for example, U-shaped bracket 77 welded, or otherwise conventionally secured to the interior of vehicle 15 and provided at the base thereof with an aperture 76 for slidably receiving coupling 70. The aft end of coupling 70 is exteriorly threaded for receipt thereon of an interiorly threaded collar 79.

*Operation*

In operation of the presently described connect and disconnect assembly 11, the parts are disposed on vehicle 15 as shown in FIG. 1 with a manual force of approximately fifteen foot-pounds being required to insert prongs 20 into the female sockets 72. When it is desired to discontinue the transfer of energy through umbilical cable 17 to vehicle 15, a remotely actuated circuit is closed to supply electrical energy to initiate the gas producing squibs 51 and 52 which, upon ignition, expel their gaseous discharge into hemispherical annular gas passageway 39. Inasmuch as gas received in passageway 39 will then exert pressure on piston head 47 of piston 43, and its identical counterpart 45, the pistons will be driven against the sidewall of vehicle 15 and exert a pushing force thereagainst. This pushing force, acting on diametrically opposed sides of sleeve 25, moves disconnect assembly 11 and its attached umbilical cable 17 in a perpendicular direction away from vehicle 15 to break the frictional contact between the prongs 20 and their counterpart female sockets 72. Any excess pushing force exerted by pistons 43 and 45 will then serve to propel assembly 11 and umbilical cable 17 laterally away from vehicle 15 to thereby eliminate any possible entanglement with the vehicle fins or other aft structure.

As obvious from the description hereinbefore, the construction of gas passageway 39 is such that the use of a single gas generating squib 51 or 52, and a single piston, either 43 or 45 in conjunction with this squib arrangement would perform the disconnect function necessary for removing assembly 11 from vehicle 15. Thus, by the use of two squibs and two pistons a double safety factor is imparted to this invention. That is, in case of a malfunction of either squib, sufficient gas will be generated to drive pistons 43 and 45 against vehicle 15 to impart the necessary pushing movement to assembly 11. Inasmuch as the frictional contact between the male and female elements of the present invention amounts to only a relative short distance, being only a fraction of an inch in some instances, any movement exceeding this distance by pistons 43 and 45 serve as propelling forces for driving assembly 11 and the attached umbilical cable 17 away from vehicle 15.

Although only one of the pistons 43 or 45 need be employed, the use of two as contemplated herein at diametrically opposed positions, assures that assembly 11 will be pushed in a straight line and propelled away from vehicle 15 to eliminate any possibility of jamming of the assembly that might be influenced upon excessive push being imparted to only one side thereof. It is also readily apparent that more than two pistons and more than two squibs may be used in a given situation and when desired, within the teachings of this invention.

*Reloading*

If a "hold" order is given after umbilical disconnect, and sufficient time elapses between execution of this order and the next countdown, to make it desirable to supply additional energy to vehicle 15, the present invention is readily adapted for on-site reloading to thereby permit rapid reconnection of umbilical cable 17 with the vehicle 15. This reloading application is readily accomplished by backing off retainer nut 37 onto cable 17 to permit removal of two-part sleeve 25 in the same direction. At this point manifold 27 is threadedly disconnected from the base or action member 29 and reloaded by inserting suitable squibs to replace the expended explosive squibs 51 and 52. Pistons 43 and 45 are retained in action member 29 and are reusable. The reassembly process is merely a reverse procedure of the disassembly described, and the device 11 is again ready for positive connection with vehicle 15. The major components of assembly are constructed of machined steel and are thus quite durable and damage resistant.

It is thus seen from the above description that the present invention provides a positive and safe, remotely controlled, quick umbilical disconnect assembly, which is reliable in use and of simple, reusable construction. In addition to these advantages of the present invention, the disconnect assembly is relatively light in weight, provides more than adequate safety in loading and disconnecting thereof, and is of relatively low cost, in comparison with prior known disconnect assemblies.

*Modified embodiment*

Referring now to FIG. 3, a modified connect and quick disconnect assembly 101 is shown. Modified assembly 101 is adapted for use with a female receptacle 113 disposed within a vehicle 115 of substantially identical structure as that described hereinbefore for receptacle 70. Accordingly, no further description of the female receptacle 113 need be given for this modification. Disconnect assembly 101 is disposed at the terminal end of an umbilical cable 117 and includes male plug 121, substantially identical to plug 21 described hereinbefore. The primary difference in assembly 101 and that previously described resides in sleeve 125 disposed about plug 121. Sleeve 125 has a flange 165 formed integral therewith which is utilized to connect the sleeve to plug 121 by way of conventional screws, one of which is shown and designated by reference numeral 163, as in the previous embodiment.

Sleeve 125 is of unitary construction and is provided with an exteriorly disposed shoulder 126 at the end thereof adjacent umbilical cable 117. A coil spring 128 is circumferentially disposed along the length of sleeve 125 with one end coil thereof being received by a circumferential groove 127 at the bottom surface of shoulder 126. The other end coil of spring 128 is adapted to bear against vehicle 115, for purposes to be further described hereinafter.

A pair of diametrically opposed bores 153 and 155 are provided along the length of sleeve 125, with two pair of lead wires 157 and 159 extending respectively, therefrom. Lead wires 157 are connected to a unitary piston motor 149 disposed within bore 153. Correspondingly, lead wires 159 extend through bore 155 to connect with a like piston motor 150. Motor 149 includes a mild explosive signal responsive charge 151 for driving a slidable piston 143, while motor 150 is of identical construction, with its charge and piston being designated, respectively, by reference numerals 152 and 145. One suitable commercial piston motor of this type is available for the Atlas Powder Company under the code designation of RXL–MD–445. Other motors designated for various specified forces or separate squibs and pistons may obviously be employed in lieu of unitary motors 149 and 150 to provide that force needed in a specific situation in use of this embodiment.

The space between cable 117 and the interior of sleeve 125 is filled with a suitable potting compound, such for example a room temperature vulcanizable plastics, or any other conventional potting compound, and generally designated by reference numeral 118 in FIG. 3.

The operation of this modified embodiment is much the same as that described hereinbefore in reference to FIG. 1. When in operative position, disconnect assembly 101 is received within female receptacle 113 with the force required for this frictional engagement, and the compression of spring 128 as connected, being approximately 12–15 foot-pounds. Upon actuation of charges 151 and 152, through closing of a remotely positioned switch circuit leading to lead wires 157 and 159, and not shown, the explosive force will slidably drive pistons 143 and 145 against vehicle 115. The force exerted by pistons 143 and 145 will be sufficient to suddenly disengage the frictional contact between disconnect element 101 and 113. This sudden removal of the forces tending to maintain spring 128 compressed causes correspondingly sudden decompression thereof, with resulting additional propelling force being imparted to sleeve 125 and its attached components. This secondary propelling force exerted by the decompression of spring 128 further assists the primary piston forces in driving assembly 101 and the attached umbilical cable 117 away from vehicle 115 sufficiently to avoid possible entanglement of cable 117 with the vehicle upon launch thereof.

In addition, spring 128 performs the further unique function of equally distributing the forces exerted by pistons 143 and 145 to cause a uniform pushing movement to be exerted against shoulder 126. Thus, in the event only one of the squibs 151 or 152 functions, the propelling force produced thereby will be uniformly distributed to assembly 101 to insure propelled removal thereof.

This embodiment, as the previously described embodiment, provides ready access to the reusable components in assembly 101. Thus, for subsequent on-site reloading of assembly 101, it is necessary only to insert new unitary piston motors for expended motors 149 and 150 in the cavities of sleeve 125 and make the proper electrical connection thereto leading to the remotely positioned energy site, to thereby permit rapid reuse of assembly 101. This rapid and unique on-site loading provision in both described embodiments obviously adds to the novelty and versatility of the present invention over other presently known disconnect assemblies.

The operational advantages and the adaptability of the herein described umbilical disconnect assembly will now be readily apparent, as will the obviousness of utilizing the herein described invention in any situation where it is feasible to employ a remotely actuated signal-responsive quick-disconnect system.

The invention has been described in connection with exemplary embodiments thereof, but it is to be understood that these embodiments are given by way of illustration only and not limitation. Accordingly, changes and modifications in the details of the apparatus can obviously be made by those skilled in the art without departing from the spirit or scope of the invention.

Although the invention has been described primarily relating to electrical cable disconnect systems, with obvious modifications and variations in the present teachings, it will be readily apparent to those skilled in the art that the present invention could be adapted for use in disconnecting hydraulic, pneumatic, and other types of umbilical cable arrangements without departing from the scope of the present invention. It is therefore to be understood, that within the scope of the appended claims, the invention may be practiced otherwise than as specifically described.

What is claimed as new and desired to be secured by Letters Patent of the United States is:

1. Apparatus forming an umbilical connect and disconnect for use on a rocket powered vehicle, comprising: an umbilical cable for transferring energy to said vehicle from a remotely located energy station, first connection means integral with said vehicle and adapted to receive energy through said cable, second connection means forming the terminal end of said cable and so constructed and arranged as to be releasably attached to said first connection means, and remotely controlled actuating means for effecting separation of said first and second connection means:
    said second connection including an electrical terminal, a tubular sleeve disposed around and fixed relative to said electrical terminal,
    an annular gaseous passageway within said sleeve,
    said remotely controlled actuating means including
        (a) at least one signal-responsive gas pressure source carried by said sleeve and disposed in communication with said passageway, and
        (b) a pair of diametrically opposed pistons disposed parallel to said terminal and within said sleeve,
    each said piston having one end thereof in communication with said gas passageway and the respective other ends thereof adapted to contact and exert pressure against the vehicle to expel said second connection and the umbilical cable away from the vehicle upon actuation of said gas pressure source.

2. Apparatus as in claim 1 wherein:
    said second connection includes a male electrical plug having a plurality of contact pins thereon and each in electrical connection with individual wires leading through said cable,
    said first connection including a female receptacle having a plurality of sockets therein for receipt of said male plug contact pins and each said socket being in electrical connection with lead wires leading to instrument components disposed within said vehicle, said pressure actuated piston being adapted to exert equal forces against the vehicle when actuated to expel said male plug axially from the female receptacle to thereby separate said pins and sockets and remove said cable away from said vehicle.

3. Apparatus for connecting and effecting sudden disconnection between an energy-transferring cable and a vehicle, comprising:

a first member integral with said vehicle and having connections thereon for receiving energy, a second member attached to said cable and adapted for frictional attachment to said first member, said second member including remotely controlled explosive means, a pair of piston means within and parallel to the axis of said second member and adapted to be driven against said vehicle, upon actuation of said explosive means, to forcibly remove said second member from its frictional attachment with said first member, and said second member also including circumferential coil spring means for uniformly distributing the piston forces acting on said second member while also assisting in propelling said second member and the attached cable away from said vehicle after release of the frictional attachment.

4. An explosive-actuated, quick-disconnect assembly for an electrical transmission cable comprising, in combination with said cable and a station of use:

a cable coupling surrounding the terminal end of said cable and receiving individual electrical wires therethrough, an electrical plug adjacent said coupling in electrical contact with said individual wires, a two-part tubular sleeve disposed around said plug, flange means for retaining said plug and said sleeve in relative fixed position, said two-part sleeve including:

(a) a centrally tapped manifold having a threaded annular projection depending therefrom, and (b) a tubular action member internally threaded over a portion of its length and connected thereby to said threaded annular projection of said manifold, said tapped manifold receiving said cable coupling, a retainer nut on said cable coupling to prevent relative movement of said manifold toward said cable, said manifold including an annular open-faced gaseous passageway facing said action member, a pair of diametrically opposed cylinders extending along the length of said action member and in communication with said passageway, a pair of pressure-responsive pistons extending from and slidably disposed in said pair of cylinders, signal-responsive means also disposed in communication with said passageway for generating gaseous pressure, whereby when said plug is attached to a mating electrical connection at said station of use and remote separation of said cable and said station is desired, the signal-responsive means is actuated to generate gaseous pressure within said gaseous passageway to thereby act on said pistons which in turn exert a pushing force against station structure to extract and propel said cable away from said station.

References Cited by the Examiner

UNITED STATES PATENTS

| | | | |
|---|---|---|---|
| 2,710,384 | 6/1955 | Dupre et al. | 89—1.5 X |
| 2,822,207 | 2/1958 | Steinmetz et al. | 89—1.5 X |
| 2,847,652 | 8/1958 | Kokalas | 89—1.5 X |
| 3,024,703 | 3/1962 | Herold | 89—1.7 |
| 3,025,487 | 3/1962 | Hennessey | 339—45 |
| 3,059,207 | 10/1962 | Baird | 89—1 X |
| 3,097,902 | 7/1963 | Hennessey | 89—1 X |
| 3,112,672 | 12/1963 | Webb | 89—1.7 |

BENJAMIN A. BORCHELT, *Primary Examiner.*

SAMUEL W. ENGLE, *Examiner.*

FRED C. MATTERN, JR., *Assistant Examiner.*